United States Patent
Athias

(10) Patent No.: US 8,509,392 B2
(45) Date of Patent: Aug. 13, 2013

(54) COMMUNICATIONS VIA A MEDIA CONTENT DEVICE

(75) Inventor: Franklyn Athias, Cherry Hill, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 175 days.

(21) Appl. No.: 13/163,330

(22) Filed: Jun. 17, 2011

(65) Prior Publication Data
US 2012/0321053 A1    Dec. 20, 2012

(51) Int. Cl.
*H04M 11/04* (2006.01)
(52) U.S. Cl.
USPC ............ 379/37; 379/88.19; 379/102.03
(58) Field of Classification Search
USPC . 379/114.13, 37, 38, 45, 88.17, 88.19–88.21, 379/102.03
See application file for complete search history.

(56) References Cited

U.S. PATENT DOCUMENTS

| | | |
|---|---|---|
| 2010/0251325 A1 | 9/2010 | Gupta |
| 2011/0142215 A1 | 6/2011 | Bi et al. |
| 2012/0002664 A1* | 1/2012 | Berk .............................. 370/352 |

OTHER PUBLICATIONS

European Search Report—EP12162985—Mailing date: Sep. 14, 2012.

* cited by examiner

*Primary Examiner* — Creighton Smith
(74) *Attorney, Agent, or Firm* — Banner & Witcoff, Ltd.

(57) ABSTRACT

Various aspects are described that may provide various communications services. These services may provide for the ability of a user to initiate or request a communication with a third party, such as an emergency service party or a vendor, using a network-coupled device that may be pre-associated with a physical address.

20 Claims, 5 Drawing Sheets

COMMUNICATIONS VIA A MEDIA CONTENT DEVICE

BACKGROUND

To reliably contact emergency services such as the police or fire department today, a user may initiate a landline telephone call to a public safety answering point (PSAP), such as 911. While such calls can be made by cellular telephone, the PSAP is not always aware of the precise location of the caller. This is not an issue with landline telephones, since the location of the landline telephone is pre-associated with a particular physical address. Even with GPS systems now built into many cellular phones, the current location is often not properly communicated to or utilized by the PSAP, and GPS and other locating technologies often do not work in certain environments, such as indoors.

Moreover, depending upon where a person is at the time that the emergency occurs, precious time may be lost in getting to a landline telephone to initiate the emergency call. This may be true even in a home, where the emergency may occur in a room separate from the landline telephone. And, many homeowners now rely solely on cellular telephones and do not have access to a landline telephone. It would therefore be useful to provide alternative means for initiating emergency communications in a reliable manner.

SUMMARY

Various aspects are described herein that may provide various communications services. These services may provide for the ability of a user to initiate or request a communication with a third party, such as an emergency service party or a vendor, using a network-coupled device that may be pre-associated with a physical address. An example of such a device is a media content viewing device, such as a television and/or related equipment. These devices are often connected to a service network on a subscription basis, such that the service network is aware of the existence of the device. For instance, each device may have a particular network address or media access control (MAC) address. Moreover, there may be certain information associated with the device that is known to the service network, such as the physical address at which the device is located, the name, telephone numbers, and/or email addresses of the owner of the device, etc. Thus, if a request for a communication is received from such a device, the service network should be able to determine certain information about the device and/or the user of the device that made the request, such as a telephone number or physical address associated with the device.

Further aspects are directed to methods, systems, apparatuses, and computer software that may perform, for example, at least the following: providing content over a network to a first device that is configured to display the content; receiving a first request from a user; determining, by a computer, a first contact destination based on which portion of the content is being displayed by the first device when the first request is made; and establishing a communication session between the user and the determined first contact destination.

Still further aspects are directed to methods, systems, apparatuses, and computer software that may perform, for example, at least the following: providing content over a network to a first device that is configured to display the content; receiving a first request from a user; determining, by a computer, a first contact destination based on which portion of the content is being displayed by the first device when the first request is made; and sending, to the first contact destination, a message that identifies a second contact destination.

Yet further aspects are directed to methods, systems, apparatuses, and computer software that may perform, for example, at least the following: receiving a request generated by a device; determining, by a computer, a type of the request; if the request is determined to be a first type of request, then determining, by the computer, a first contact destination based on an identity of the first device; and if the request is determined to be a second type of request, then determining, by the computer, a second contact destination based on which portion of video content is being displayed by the first device when the first request is made.

Still further aspects are directed to methods, systems, apparatuses, and computer software that may perform, for example, at least the following: receiving, over a network, a selection from a user of an emergency contact destination; storing data associating the emergency contact destination with a first device; and receiving, over the network, an emergency service request from the first device. Responsive to the emergency service request, the following may be performed: determining from the stored data the emergency contact destination associated with the first device, and establishing a communication session between the user and the determined emergency contact destination.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
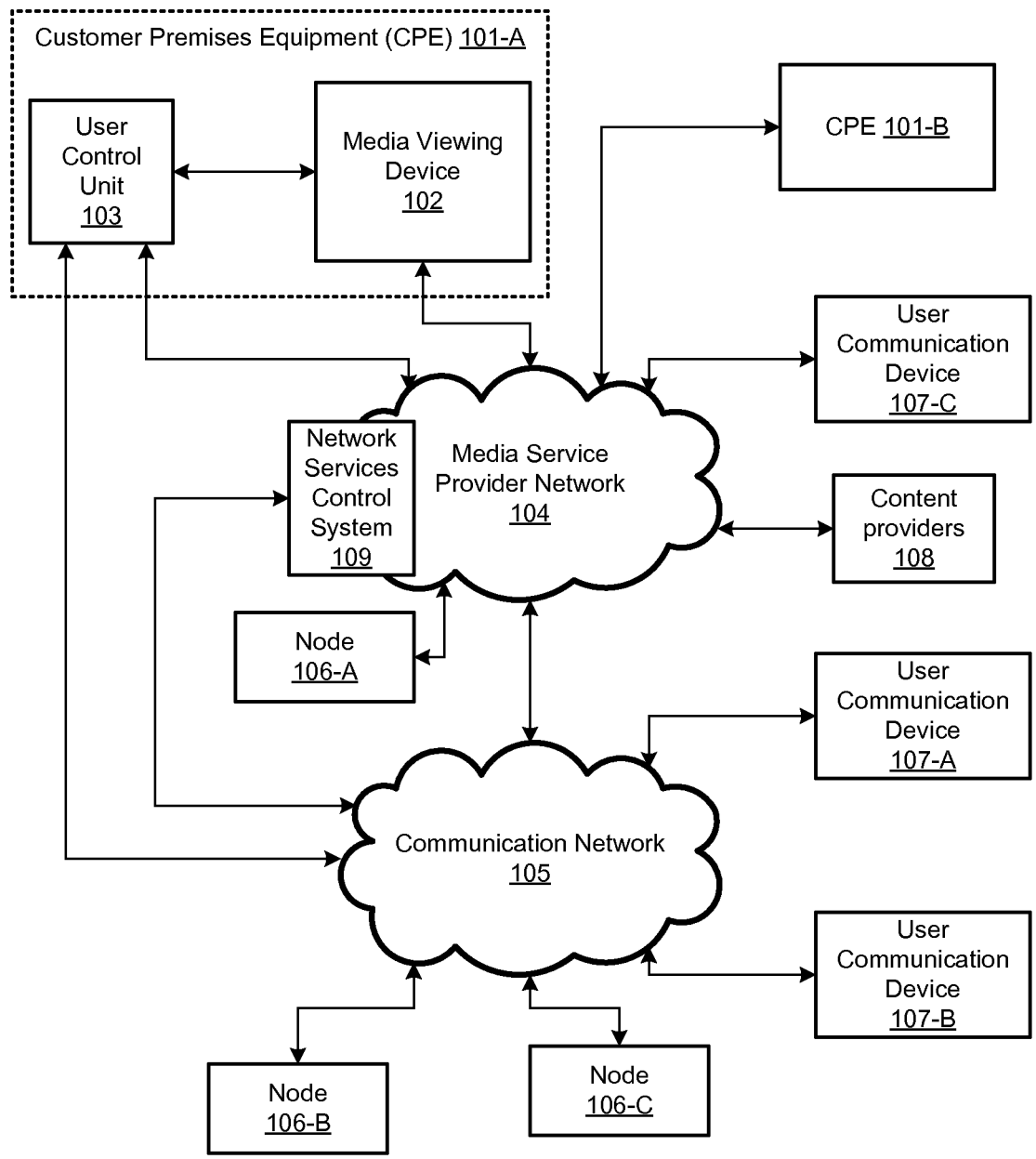
FIG. 1 is a block diagram of an example system that may be used to perform various functions and provide various services according to aspects as described herein.

Referring to FIG. 1, an example system is shown that may be used to perform various functions and provide various services as will be described herein. The example system of FIG. 1 as shown includes one or more networks, such as media service provider network 104 and/or communication network 105. One or both of networks 104 and 105 may provide telecommunications services, such as by allowing various consumer users (such as subscribers) of the respective networks to communicate data and/or voice through the networks. In addition or alternatively, one or both of the networks may provide multimedia content (e.g., video and/or audio content such as scheduled television programming, on-demand content, pay-per-view content, multimedia data files, and/or other data) from one or more content providers 108 to one or more users of the networks.

In the particular embodiment shown in FIG. 1, it will be assumed that media service provider network 104 is configured to both provide at least multimedia content services and telecommunications services to users, and that communication network 105 is configured to provide at least telecommunications services to users. Media service provider network 104 and/or communication network 105 each may be or include, for example, a coaxial cable, fiber, or hybrid-fiber coaxial network; a landline telephone network such as a public switched telephone network (PSTN); a wireless network; a cellular telephone network; a satellite network; a local area network; a packet-switched network such as the Internet; and/or any combination or subcombination thereof. The networks 104, 105 each may operate using one or more protocols, such as Transmission Control Protocol/Internet Protocol (TCP/IP), Data over Cable Service Interface Specification (DOCSIS), Signaling System No. 7 (SS7), and/or Stream Control Transmission Protocol (SCTP), to name a few. In addition, networks 104 and 105 may be physically separate networks with separate protocols and interfaces, they may only merely logically separate, or they may be together considered a single network.

Each network 104, 105 may serve one more end users. Each end user may have certain devices that are configured to communicate (uni-directionally or bi-directionally) with the respective network. By way of example, one or more end users each having one or more customer premises equipment (CPE) 101 are shown in FIG. 1 as being communicatively coupled to media service provider network 104 and/or communication network 105. In FIG. 1, two CPEs 101-A and 101-B are shown, however this is merely an example; there may be any number of CPEs for any number of users. CPEs 101 in this example may each include a media viewing device 102 and a user control unit 103.

Media viewing device 102 may be used for displaying multimedia content received from media service provider network 104, and may include, for example, a television, a computer with a display, a smart cellular telephone, a television set-top box, a home gateway, a digital video recorder (DVR), and/or any combination or subcombination thereof. User control unit 103 may be used to interact with networks 104 and/or 105, such as by issuing requests to networks 104 and/or 105 for various services and/or multimedia content. User control unit 103 may be physically part of media viewing device 102 or it may be physically separate, and may include a user interface such as buttons, a display, a mouse, a microphone, and/or a keyboard for user interaction. In some embodiments, user control unit 103 may be a wireless or wired remote control for use with media viewing device 102.

Other user devices may also be in communication with networks 104 and/or 105, such as one or more user communication devices 107-A, 107-B, 107-C. While three user communication devices are shown, this is merely by way of example; there may be any number of user communication devices. User communication devices 107-A-C may themselves be or include an apparatus for audio and/or video communication with another party (e.g., a microphone and/or speaker) via networks 104 and/or 105. For example, user communication devices 107-A-C may be or include a landline-connected telephone, a cellular telephone, a videophone, and/or an intercom. In some embodiments, one or more of user communication devices 107-A-C may be configured in a manner such as described herein with regard to customer premises equipment 101. Thus, any of user communication devices 107-A-C may also include a media viewing device and/or a user control unit such as described herein.

Various other locations 106-A, 106-B, 106-C, broadly referred to herein as nodes, may also be in communication with networks 104 and/or 105. While three of such nodes are shown, this is merely by way of example; there may be any number of nodes. These nodes 106-A-C may be systems, networks, and/or devices such as computers, that may provide services to CPEs (e.g., CPE 101) and user communication devices (e.g., user communication devices 107-A-C). For example, each of nodes 106-A-C may represent one or more telephone systems and/or web servers for a particular vendor, such as an automobile manufacturer, a restaurant chain, a clothing retailer, a financial services provider, a charity, a governmental agency, or the like.

In addition, a system 109, referred to herein as a network services control system, is shown in FIG. 1 as being communicatively coupled to and/or part of networks 104 and/or 105. This system 109 represents systems that may be used to provide various services to consumer users and vendors as will be described in further detail below. Examples of such services may include request handling, call switching and/or routing, and/or content provisioning. Network services control system 109 may be physically located in a single location or distributed amongst a plurality of locations, and may represent a number of different physical systems, at least some of which may presently exist in traditional networks and that may be modified to provide the services described herein. Additionally or alternatively, one or more systems may be added to traditional networks in order to provide some or all of the services described herein.

In an example embodiment, each CPE 101 may be a display, such as a television or video monitor, and may include or be connected to a device that communicates with network 104 and/or 105 (such as a home gateway, set-top box, digital video recorder, and/or personal computer). Since the network may ascertain or otherwise know the location and/or user account associated with each CPE 101, a request from a particular CPE 101 for communication with a third party may allow the system to determine a phone number or other contact destination from the user's account information associated with the CPE 101 making the request. As will be described in further detail below, the system may thus arrange for a communication between the determined contact destination of the user and the third party.

Any of the elements of FIG. 1 may be implemented as or otherwise include one or more computers. A computer may include any electronic, electro-optical, and/or mechanical device, or system of multiple physically separate such devices, that is able to process and manipulate information, such as in the form of data. Non-limiting examples of a computer include one or more personal computers (e.g., desktop, palmtop, or laptop), servers, smart phones, personal digital assistants (PDAs), television set top boxes, service gateway devices, digital video recorders, mobile video devices, and/or a system of these in any combination or subcombination. In addition, a given computer may be physically located completely in one location or may be distributed amongst a plurality of locations (i.e., may implement distributive computing). A computer may be or include a general-purpose computer and/or a dedicated computer configured to perform only certain limited functions, such as a network router.

Figure 2:
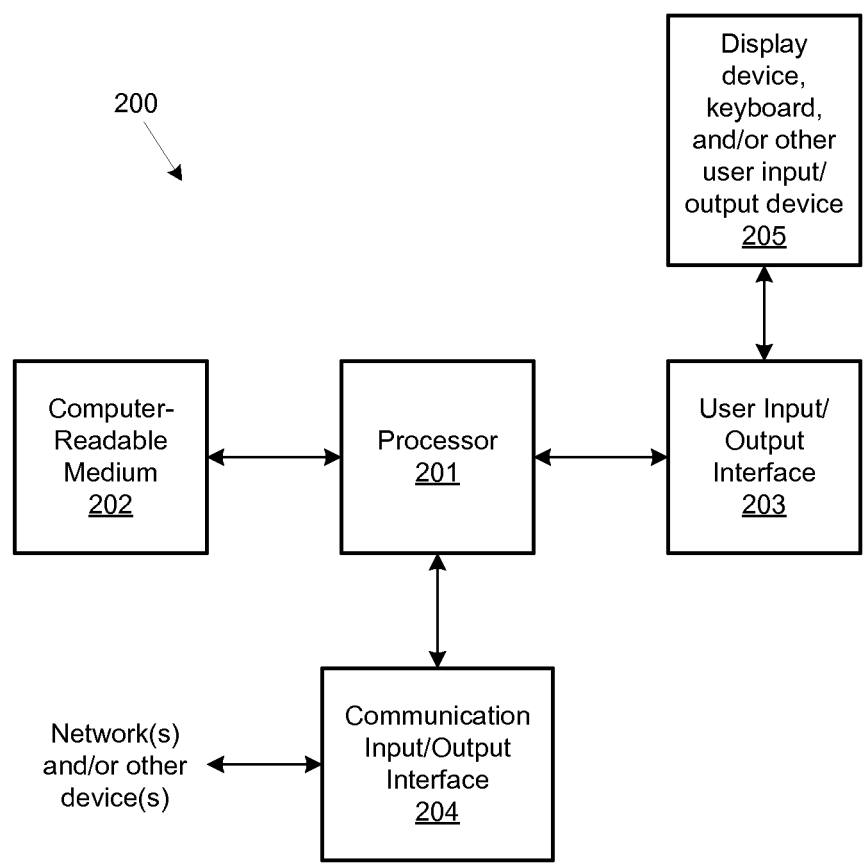
FIG. 2 is a block diagram of an example of a computer that may be used to implement one or more portions of the example systems of FIG. 1.

An example functional-block representation of a computer 200 is shown in FIG. 2, from which any of the elements of FIG. 1 may be implemented. Computer 200 may include hardware that may execute software to perform specific functions. The software, if any, may be stored on a non-transitory computer-readable medium 202 in the form of computer-readable instructions. Computer 200 may read those computer-readable instructions, and in response perform various steps as defined by those computer-readable instructions. Thus, any functions attributed to any elements of FIG. 1 as described herein may be implemented, for example, by reading and executing such computer-readable instructions for performing those functions, and/or by any hardware subsystem (e.g., a processor 201) from which computer 200 is composed. Additionally or alternatively, any of the above-mentioned functions may be implemented by the hardware of computer 200, with or without the execution of software. For example, computer 200 may be or include an application-specific integrated circuit (ASIC), field-programmable gate array (FPGA), or other type of circuitry that is configured to perform some or all of the functions attributed to computer 200. In such embodiments, processor 201 may be implemented as or otherwise include the ASIC, FPGA, or other type of circuitry.

Computer-readable medium 202 may include not only a single physical intransient medium or single type of such medium, but may alternatively or additionally include a combination of one or more such media and/or types of such media. Examples of computer-readable medium 202 include, but are not limited to, one or more memories, hard drives, optical discs (such as CDs or DVDs), magnetic discs, and magnetic tape drives.

Computer-readable medium 202 may be physically part of, or otherwise accessible by, computer 200, and may store computer-readable instructions (e.g., software) and/or computer-readable data (i.e., information that may or may not be executable). In the present example, computer-readable medium 202 (such as physical memory and/or a hard drive) may be included as part of any one or more of the elements of FIG. 1, and may store computer-executable instructions and/or data used by any of those elements. Alternatively or additionally, computer-readable medium 202 storing the data and/or software may be physically separate from, yet accessible by, any of the elements of FIG. 1.

Computer 200 may also include a user input/output interface 203 for receiving input from a user (e.g., via a keyboard, mouse, and/or remote control) and providing output to the user (e.g., via display device, an audio speaker, and/or a printer). Such user input/output devices are designated in FIG. 2 as element 205. The user input/output devices may be considered part of computer 200 or separate from yet communicatively coupled to computer 200. Computer 200 may further include a communication input/output interface 204 for communicating with devices external to computer 200, such as with other elements in FIG. 1. Such communications may be direct communications with the other device(s) and/or via one or more networks such as networks 104 and/or 105. Thus, any communication between elements in FIG. 1 may be attributed to communication via communication input/output interface 204 of those respective blocks.

Networks 104 and/or 105 may be configured such that each CPE 101 communicatively coupled to the network may be uniquely identified. For instance, each CPE 101 may have a unique media access control (MAC) address, internet protocol (IP) address, telephone number, device name, or other type of identifier that is unique amongst the other CPEs communicatively coupled to the networks 104 and/or 105. These unique identifiers may be assigned and/or tracked by network services control system 109, such that network services control system 109 may know, at any given time, which CPEs are currently communicatively coupled to network 104 and/or 105, which CPEs are currently turned on and/or presenting content to a user, and/or what content is being presented to each user. This information may be communicated by each CPE via the respective network to network services control system 109, as needed or on a periodic basis.

Figure 3:
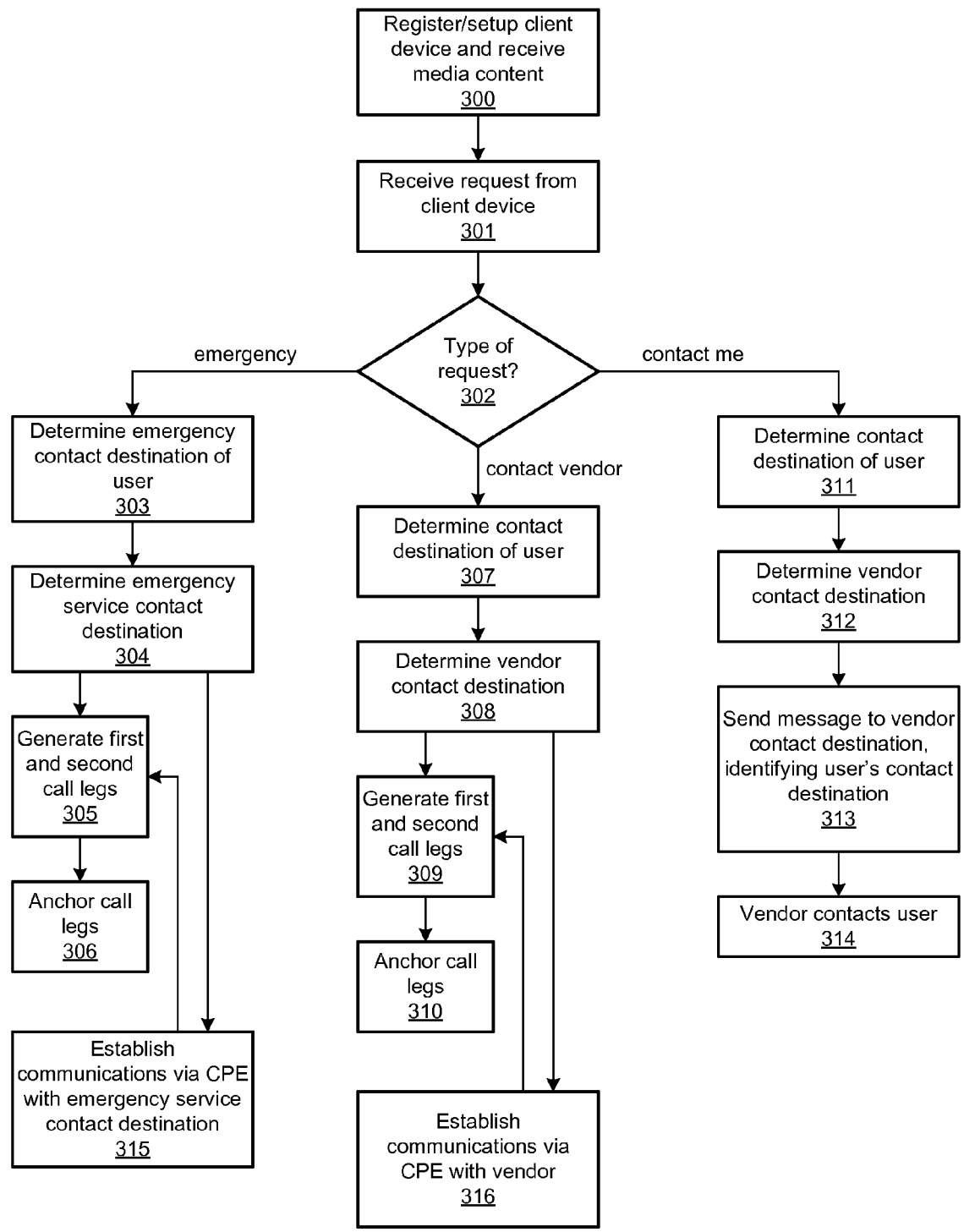
FIG. 3 is a flow chart of an example process that may be performed by systems such as that shown in FIG. 1, in accordance with aspects as described herein.

FIG. 3 is a flow chart of an example process that may be performed by systems such as that shown in FIG. 1, in accordance with at least some aspects as described herein. For example, all of the steps of FIG. 3 may be performed by network services control system 109. Alternatively, at least some of the steps of FIG. 3 may be performed by other devices or functions, such as by CPE 101 and/or by other portions of networks 104 and/or 105. While the various steps of the process of FIG. 3 are shown in a particular order and are separated in a particular manner, it is to be understood that such ordering and separation are merely illustrative. Any of the steps may be re-ordered as appropriate and desired, and any of the steps may be merged and/or further subdivided. For example, step 304 may be performed prior to step 303, or they may be performed simultaneously.

As will be described with regard to FIG. 3, a user of a client device such as CPE 101-A may be able to request that a third party be contacted, such as an emergency service party or a vendor, have that party contact the user at a predefined contact destination device (e.g., the user's landline phone, cell phone, etc.), or otherwise request that communications be established between a contact destination of the third party and a contact destination of the user. Which party is contacted may depend upon the type of request and/or a context of the request. An example context of the request is which content is being displayed to the user by the CPE at the time that the request by the user is made.

Thus, for example, at step 300, a client device such as CPE 101-A may be registered with networks 104 and/or 105. Registration may include a handshaking protocol in which the identity of the client device is identified to the network, and may further involve exchanging various decryption keys and/or other information needed or otherwise useful for selecting and receiving media content and/or sending/receiving other to/from the network. For example, registration may involve the client device sending a message to the network including an identity of the client device (e.g., the MAC address of the client device), and/or assigning a network address (e.g., an IP address) to the client device. Registration may further involve authenticating the identity, such as using a password, and determining whether an active subscription account is associated with the client device. Once the client device is properly registered, the client device may receive content, such as multimedia (audio and/or video) content from networks 104 and/or 105. For example, the client device may tune to or otherwise select desired multimedia content.

Also as part of step 300 (or at any time as desired by the user), various preferences and other settings associated with the client device may be set up, automatically and/or manually by the user. Such setup may involve, for instance, defining or confirming contact destinations of the user and/or of an emergency services party. For example, the user may indicate that, when making an emergency services request, a call or other communication session between an emergency services party at a particular contact destination and a user communications device at a particular telephone number be arranged. Or, the user may indicate that, when requesting a vendor to contact the user, which telephone number or email address should be used, or whether the telephone number used should be, e.g., a randomly chosen temporary telephone number.

These preferences may be stored locally at the client device and/or communicated to the network, such as to network services control system 109.

At step 301, network services control system 109, for instance, may directly or indirectly receive a request from a client device such as CPE 101-A. The request may be made while media content is being streamed by the network to, and/or displayed by, CPE 101-A. The request may be transferred via networks 104 and/or 105, and may be in the form of a data message such as a data packet. The request may be initiated manually by the human user and/or automatically by CPE 101-A. Where the request is manually initiated, the human user may do so with user control unit 103, such as by pressing a button on a remote control other otherwise selecting a function. Where the request is automatically initiated, the initiation of the request may be triggered by any event, such as in response to a sensor detecting an environmental condition (e.g., a smoke or fire detector detecting smoke or fire, or a burglar alarm detecting a break-in). Such a sensor (or a system having such a sensor) may be communicatively coupled to CPE 101-A to provide for such a feature.

The request received at step 301 may be one of a plurality of different types of requests. For example, the request may be an emergency service request to contact an emergency service party, such as 911, police, fire, and/or emergency medical services (EMS). For example, the user may be sitting in his or her living room, watching a movie or other media content on media viewing device 102, when the user feels chest pains. Rather than first getting up to find the telephone, the user might simply make a selection at CPE 101-A to initiate an emergency service request. This might be faster, since the user is likely to be in possession of user control unit 103 (e.g., a remote control) for CPE 101-A while watching the movie. The user selection may be via a button on the remote control and/or a selection on a menu or other user interface displayed on media viewing device 102. In response to the user selection, CPE 101-A may transmit the emergency service request to the network to which CPE 101-A is communicatively coupled. The emergency service party may be governmental or quasi-governmental.

Other examples of request types include a request to communicate with a commercial vendor via a communication session, such as via a telephone call, or a request to have the vendor call or otherwise contact the user regarding certain products and/or services. The type of request may be identified by the request itself and/or may be otherwise identified using certain request protocols.

At step 302, network services control system 109 may receive the request sent by CPE 101-A, and may determine the type of request. Depending upon the type of request, in this example the process may move to either step 303, step 307, or step 311.

If the request is an emergency service request (the "emergency" branch in FIG. 3), then the process moves to step 303, in which network services control system 109 may determine which user's contact destination should be connected to a contact destination of an emergency service party. A contact destination may be an identifier of a device, network location, address, or other destination to which communications may be directed and/or from which communications may be sent. Examples of contact destinations include, but are not limited to, a telephone number, an email address, an instant messaging user ID, a uniform resource locator (URL), an IP address or other network address, a MAC address, and/or a device serial number.

The particular user's contact destination for emergency service communications may be stored in a non-transitory computer-readable medium, such as in a hard drive or memory, and may have been previously defined during performance of step 300 (FIG. 3) and/or may be dynamically determined in response to the request. In some embodiments, the user's contact destination may be stored as part of network subscription account information for that user. The computer-readable medium may be part of or otherwise accessible by network services control system 109, and may store a plurality of such contact destinations for each user, and stored in such a way so as to be associated with those respective users. For example, such information may be stored in the form of a database. Where network services control system 109 is configured such as in FIG. 2, then the computer-readable medium may be computer readable medium 202.

The user's contact destination for emergency service communications may be a contact destination of that user's CPE (e.g., CPE 101-A) or associated with a particular user communication device separate from the CPE, such as any one of user communication devices 107-A-C on which the user wishes to communicate with the emergency service party. For example, where the user's contact destination associated with an emergency service request is a telephone number, the telephone number may be the telephone number of user communication device 107-A.

At step 304, network services control system 109 may determine the contact destination of the appropriate emergency service party. The contact destination of the emergency service party may depend upon, for example, the location of the CPE 101-A making the request, the location of the user communication device 107-A associated with the telephone number determined in step 303, and/or the nature of the emergency (the user may select from different types of emergency service requests, such as a medical emergency, a police emergency, or a fire emergency). In some embodiments, the contact destination of the emergency service party may be the telephone number of a 911-type call center such as a public safety answering point (PSAP) serving the emergency service zone in which CPE 101-A or user communication device 107-A is located. In further embodiments, the contact destination of the emergency service party may be the telephone number 911, such that a call to 911 would result in enhanced 911 (E911) automatic routing of the call by networks 104 and/or 105 to the appropriate PSAP. Still further examples of an emergency service party include a direct number to a hospital, fire department, doctor, police department, private security firm, or the like.

The contact destination of the emergency service party does not need to be a telephone number; it could additionally or alternatively be another type of contact destination, such as an IP address or other network address, an email address, an instant messaging user ID, a uniform resource locator (URL), a MAC address, and/or a device serial number of a device associated with the emergency service party.

If the contact destinations of the user and the emergency service party are both telephone numbers, then at step 305 network services control system 109 may establish a call leg to each of those telephone numbers. For example, network services control system 109 may call the telephone number of user communication device 107-A, and may also separately call the telephone number of the emergency service party. The calls may be, for example, traditional PSTN-type calls and/or voice-over-IP (VOIP) calls. At step 306, network services control system 109 may anchor or otherwise couple the two call legs (e.g., the two calls) together to form a call between the two telephone numbers. The call anchoring may be performed automatically or in response to an event such as one or both of the two parties answering the respective call. It is noted that the user's telephone number may be the telephone number of a landline or cellular telephone. The concerns discussed previously about a PSAP not being aware of the user's location when an emergency call is made from a cellular telephone may not necessarily be a concern in the present example. This is especially true where the original emergency services request is made by a CPE 101 that may be assumed to be in a fixed physical location. In such a case, it may be presumed that the location of the user's cellular telephone may also be the same location as that of the CPE 101.

Depending upon the type of contact destination for the emergency service party, at step 315 a communication session instead may be established over the appropriate network(s) with the emergency service party contact destination directly via the CPE (e.g., via CPE 101-A). In such a case, the user's emergency contact destination as determined at step 303 may be a contact destination of the CPE itself, rather than of a separate device. During such a communication session, the user may interact with the CPE (e.g., via user control unit 103 and media viewing device 102) to view and respond to graphical and/or textual messages sent by the emergency service party and displayed by media viewing device 102, and/or to voice and/or video communications. For example, the emergency service party may send a message for display on media viewing device 102, such as, "Press the A button if you need an ambulance, or press the B button if the police are required." The user of the CPE could then respond accordingly via user control unit 103. In this way, an emergency operator may maintain contact with the person requiring emergency assistance, such as by sending and/or receiving periodic messages to keep the person informed and/or receive status updates from the person.

During the communication session established at step 315, the user may also be presented with an option to communicate via another device, such as via a telephone call. If the user selects this option, then the process may move from step 315 to step 305, in which the above-described first and second call legs may be generated and anchored together to establish a telephone call between the user and the emergency service party.

In addition to establishing communications with the emergency service party at steps 305, 306, and/or 315, the system may also send a message to one or more other predetermined parties based on the user's preferences, which may be stored at or otherwise accessible by, e.g., network services control system 109. This may be useful where, for instance, the user is an elderly person, and if the user requests emergency services at step 301, then that user's adult kids may be automatically contacted (e.g., via an SMS message to their cell phones, or via an email, etc.). In that case, the user's account preferences may indicate the contact destinations of those other predetermined parties to be contacted in the event of an emergency service request.

In still further examples, a silent alarm function may be implemented to initiate an emergency service request. Where, for instance, where intruder may have entered the user's home, and the user may be under duress, the user may initiate an emergency service request by tuning to a predetermined channel of media content, or to a predetermined item of media content as provided to the user's CPE over the network 104 and/or 105, or certain media content already stored at the user's CPE. Network services control system 109 may detect that the user's CPE has selected that particular channel or item of media content, and interpret such selection as an emergency service request. Alternatively, the CPE itself may interpret such tuning as a command to send an emergency service request over network 104 and/or 105. Alternatively, the user may select and emergency service request (such as by pressing a button), and in response a message may be displayed by media viewing device 102 such as, "Press the A button if you would like to watch the TV show Cops." If the user presses the A button at that point, then this could secretly indicate that the user would like the police to come to the user. Using the CPE in such ways may allow the user to request certain emergency services while reducing the chances of arousing an intruder's suspicions.

Moreover, the silent alarm may allow for the emergency service provider to surreptitiously provide information to the user regarding the status of an emergency response, such as by causing the user's CPE to tune to a particular channel or item of media content to indicate a particular status. For example, if the user's CPE is tuned to the television show "Cops," then this may indicate to the user that the police are on their way.

If, on the other hand, the request is determined at step 302 to be a request to contact a vendor (the "contact vendor" branch in FIG. 3), then the process may move to step 307. Step 307 is similar to step 303, except that the contact destination (e.g., telephone number) of the user may be a different contact destination than the one used for emergency services. At step 308, a vendor, and/or the contact destination of a vendor, may be determined.

The particular vendor to be contacted may be identified by the request itself and/or may be determined based on context. For example, the determined vendor may depend upon what content is currently being displayed by the user device that made the request. If CPE 101-A is currently displaying an advertisement for an automobile of a certain manufacturer, or other content (e.g., a television series) that includes a reference to or otherwise relates to such an automobile, then the determined vendor may be, for example, the manufacturer or retailer of the automobile. As another example, if an actor in a television show being displayed by CPE 101-A is wearing a particular jacket and eating at a particular restaurant, then the determined vendor may be, for example, the restaurant or the manufacturer of the jacket. In the latter example, where there may be multiple potential vendors to which the request might reasonably relate, then CPA 101-A may present a menu of vendor choices to the user. Or, where only a single vendor is determined to be relevant to the content currently being displayed, then that vendor may be automatically be selected as the determined vendor.

The determination of which vendor to obtain the contact destination for may be made locally by CPE 101-A or by the network 104 and/or 105, such as by network services control system 109. Where the decision is made by the network, the network may be aware of what content is currently being displayed by each CPE 101-A. For instance, the request may include an identification of what content is currently being displayed by CPE 101-A and/or the particular portion of the content currently being displayed (e.g., the timestamp within the content). Where the decision is made locally, then the request may identify the chosen vendor and/or the chosen vendor's contact destination.

Once the vendor contact destination has been determined at the user end or the network end, and if the user and vendor contact destinations are each a telephone number, then at step 309, two call legs may be made (e.g., by network services control system 109) in a manner similar to that previously described with regard to step 305. In this case, one call leg is to the user's telephone number (e.g., the telephone number of user communication device 107-C) and the other call leg is to the determined vendor's telephone number. At step 310, similar to step 306, network services control system 109 may anchor the two call legs together to form a call between the two telephone numbers. The call anchoring may be performed automatically or in response to an event such as one or both of the two parties answering the respective call.

Depending upon the type of contact destination for the emergency service party, at step 316 a communication session instead may be established over the appropriate network(s) with the vendor's contact destination directly via the CPE (e.g., via CPE 101-A). In such a case, the user's contact destination as determined at step 307 may be a contact destination of the CPE itself, rather than of a separate device. During such a communication session, the user may interact with the CPE (e.g., via user control unit 103 and media viewing device 102) to view and respond to graphical and/or textual messages sent by the vendor and displayed by media viewing device 102, and/or to voice and/or video communications.

During the communication session established at step 316, the user may also be presented with an option to communicate via another device, such as via a telephone call. If the user selects this option, then the process may move from step 316 to step 309, in which the above-described first and second call legs may be generated and anchored together to establish a telephone call between the user and the vendor.

Where the request from CPE 101-A is determined at step 302 to be a request for the vendor to contact the user (the "contact me" branch in FIG. 3), then the process may move to step 311, which is similar to step 307 and in which network services control system 109 determines the appropriate contact destination for the user (which may be a contact destination of the CPE itself and/or of a separate device). This "contact me" branch of FIG. 3 may be desirable to the user in comparison with the "contact vendor" branch of FIG. 3, because it may allow the user to communicate with the vendor while avoiding waiting on hold for the vendor to be available. For instance, if the user were to directly call the vendor (or have a call set up with the vendor, such as at steps 309 and 310 of the "contact vendor" branch), then the user may be put on hold by the vendor until the vendor is ready to speak with the user. But, if the "contact me" branch of FIG. 3 is performed (steps 311-313), then the user may be contacted by the vendor only once the vendor is ready, thus freeing the user from having to wait on hold.

Continuing with the "contact me" branch of FIG. 3, at step 312 (similar to step 308), a vendor, and/or the contact destination of a vendor, may be determined. At step 313, rather than anchoring call legs between the user and the vendor, network services control system 109 may send a message to the determined vendor's contact destination. The vendor's contact destination may be different for step 313 than for step 310, even if the vendor is the same. For instance, where the contact destination for a vendor may be determined at step 308 to be a telephone number, the contact destination for the same vendor may be determined at step 312 to be an email address. Thus, the contact destination for a given vendor may depend upon the type of request made at step 301.

For example, if the vendor's contact destination is an email address, then the message may be an email sent to that email address. Or, if the vendor's contact destination is a telephone number, then the message may be, for instance, a fax, instant message, text message (e.g., SMS message), or voice message that is sent to that telephone number.

The message sent at step 313 may identify the contact destination of the user that was determined at step 311. In response to receiving the message, at step 314 the vendor may communicate with the user at the identified user's contact destination. For instance, if the user's contact destination is a telephone number, then the vendor may call that telephone number. Or, if the user's contact destination is an email address, then the vendor may send an email to that email address.

In some cases, the user's contact destination may be a temporary contact destination that is generated and used (e.g., one time only) for the purposes of communication with the selected vendor. For example, if the user's contact destination is a telephone number or email, it may be a temporary telephone number or email generated solely for the purpose of that instance of communication with the vendor. After the communication with the vendor has ended, the temporary contact destination may be disabled or disassociated with the user's communication device or account. For instance, where the contact destination is a temporary telephone number, a call by the vendor to the temporary telephone number may be connected to the user's communication device once, but after that call has ended (and/or after a predetermined period of time has passed), a further dialing of the temporary telephone number may no longer connect to the user's communication device. This may allow for a measure of privacy, which may be appropriate where the user wishes to communicate with a vendor but does not wish for the vendor to pursue further communications with the user at a later time. Temporary telephone numbers and email address are well-known. For instance, there currently exist free email websites such as www.hotmail.com that allow email addresses to be generated quickly and dynamically, and there also currently exist services such as www.tossabledigits.com that provide temporary telephone number services.

Figure 4:
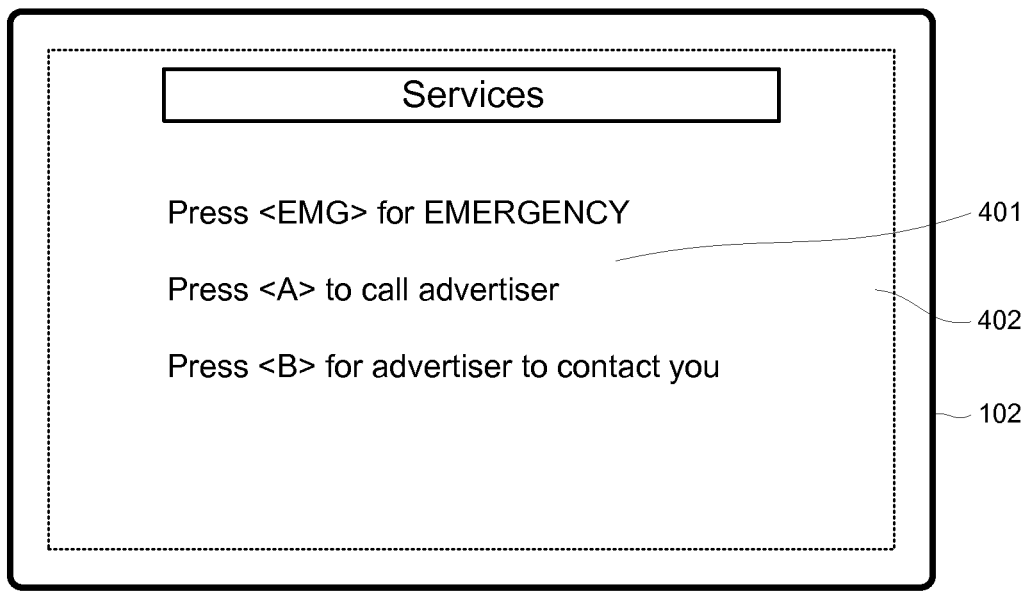
FIGS. 4 and 5 are example screen shots of displayed screens that may be presented to the user in accordance with aspects as described herein.

To initiate any of the branches of FIG. 3, the user of CPE 101-A (for example) may utilize user control unit 103 to make a selection. Referring to FIG. 4, an example of a user interface 401 is shown that may be presented to the user of CPE 101-A, such as on a media viewing device 102. In this example, the user may call up a Services menu, which may include options for selecting the "emergency" branch of FIG. 3 (in this example, by pressing an "EMG" button on user control unit 103), selecting the "contact vendor" branch of FIG. 3 (in this example, by pressing an "A" button on user control unit 103), and selecting the "contact me" branch (in this example, by pressing a "B" button on user control unit 103). In response to such a user selection (which would cause a request to be sent by CPE 101-A as in step 301), CPE 101-A may cause to be performed the appropriate one of the three branches of FIG. 3. User interface 401 may be overlaid on multimedia content 402 that is being displayed (such as shown in FIG. 4), or it may be displayed separately from the content. The presentation of user interface 401 as in FIG. 4 may be in conjunction with the performance of, for example, step 301.

Figure 5:
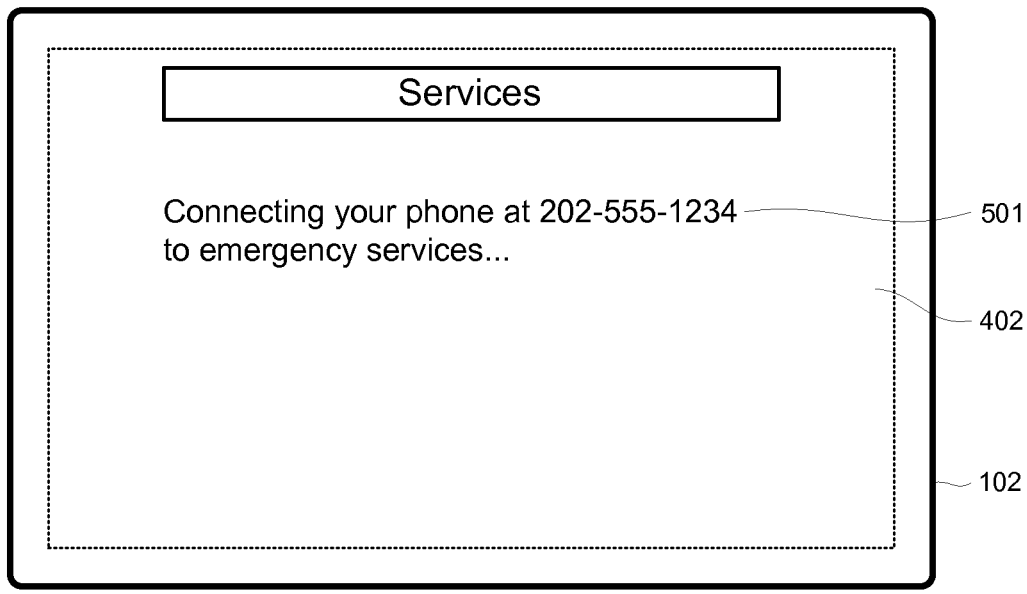

FIG. 5 shows an example of a user interface that may be displayed by media viewing device 102 in response to the user pressing the EMG button while user interface 401 of FIG. 4 is being displayed. In this example, user interface 501 may indicate that the user's phone (which may be particularly identified by a phone number or a name, for example) is being connected to emergency services. Such a display may be presented to the user in conjunction with performing, for example, steps 304 and/or 305.

In further embodiments, there may be no user interface 401 presented to the user, and instead only user interface 501 would be presented upon an appropriate user selection of one of the options for emergency services, calling out, or having a vendor contact the user. Moreover, while certain buttons of user control unit 103 are discussed, these are merely by way of example. The user may select one of the three options via other means, such as by pressing other buttons, typing a command, initiating a voice command, or the like.

Figure 6:
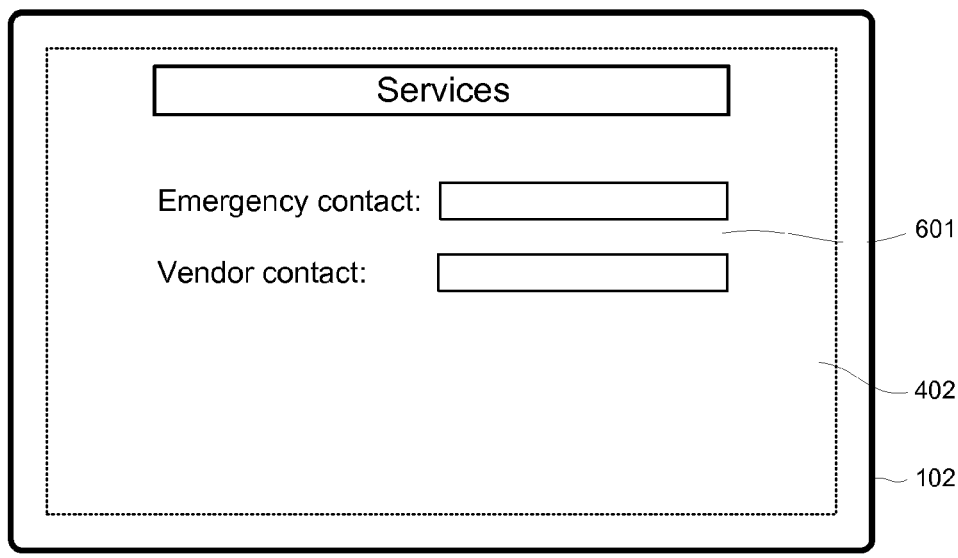
FIG. 6 is another example screen shot of a displayed screen that may be presented to the user in accordance with aspects as described herein.

FIG. 6 shows another example screenshot that may be displayed by media viewing device 102. In this example, a user interface 601 may be displayed that allows the user of CPE 101-A to enter the user's emergency contact destination ("Emergency contact" in FIG. 6), as well as the user's contact destination to be used by vendors ("Vendor contact" in FIG. 6), into text boxes. User interface 601 may be presented to the user as part of performing step 300 during device registration and setup, and/or at any subsequent time upon user request.

As previously described, the user's contact destinations each may any type of contact destinations, such as but not limited to a telephone number, email address, instant messaging user ID, uniform resource locator (URL), IP address, MAC address, and/or device serial number. The contact destinations entered into the text boxes may be stored in one or more computer-readable media, such as a computer-readable medium of network services control system 109, and associated with that user or that user's CPE.

The entered user's emergency contact destination in "Emergency contact" may be the contact destination determined at, e.g., step 303 of FIG. 3. Thus, when step 303 is performed, the system may look up the user's emergency contact destination that was previously stored upon entry into the "Emergency contact" text box of FIG. 6. Likewise, the entered user's contact destination in "Vendor contact" may be the contact destination determined at, e.g., steps 307 or 311 of FIG. 3. Thus, when steps 307 or 311 are performed, the system may look up the user's contact destination that was previously stored upon entry into the "Vendor contact" text box of FIG. 6.

As previously described, the particular vendor contact destination determined in steps 308 and 312 may depend upon the particular content that is being displayed by the user's media viewing device 102 at the time that the request is received from the client device at step 301. The currently-displayed content may be determined in any of a variety of ways. For example, network services control system 109 may track what media content, and/or which portion thereof, is currently being streamed to and/or displayed by each CPE 101. In such embodiments, upon receipt of the request at step 301, network services control system 109 may determine the appropriate vendor contact destination based on the currently-displayed media content at steps 308 or 312. In further embodiments, each CPE 101 itself may be aware of what media content (and/or portion thereof) is currently being displayed by the respective CPE 101. In these embodiments, the CPE 101, upon receipt of a user command or other trigger, may determine the appropriate vendor contact destination based on the currently-displayed media content. Moreover, the request sent at step 301 may include an indication of the determined vendor contact destination. Alternatively, the request sent at step 301 may include an indication of the currently-displayed media content, such that network services control system 109 may determine the vendor contact destination based on the indication included in the request.

Figure 7:
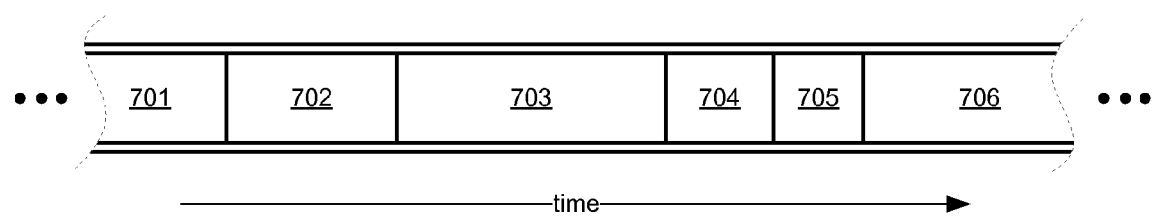
FIG. 7 is a diagram showing an example stream of content over time that may be displayed by a media viewing device, in accordance with aspects as described herein.

To aid in determining which media content is currently being displayed, each item of media content, and/or various portions thereof, may include or otherwise be associated with data tags identifying the media content, media content portion, and/or one or more associated vendor contact destinations. FIG. 7 is a diagram showing an example of such tagged media content over time, either as a data stream from the network or as a media file that may have been stored locally by CPE 101-A (e.g., on a DVR) and is being played back. In this example, the media content is shown to include a plurality of portions 701, 702, 703, 704, 705, and 706. Each portion may be associated with one or more vendor contact destinations. For example, portion 701 may be an advertisement for a particular automobile, and so the associated vendor contact destination(s) may be contact destination(s) associated with the automobile manufacturer or dealer. Portion 702 may be, for example, an advertisement for a restaurant, and the associated vendor contact destination(s) for that portion 702 may be a contact destination for the restaurant (e.g., the restaurant's website, email address, and/or telephone number). Portions 703-706 may each be, for instance, a portion of the same television series, where each portion may be associated with a different vendor. For example, portion 703 may show the main character putting on an article of clothing, and so the associated vendor contact destination(s) for portion 703 may be contact destination(s) for a vendor associated with the article of clothing. Portion 704 may show, for instance, the actor getting into a vehicle, and so the associated vendor contact destination(s) for portion 704 may be contact destination(s) for a vendor associated with the vehicle.

The tags indicating the media content portions, vendors, and/or the vendor contact destinations may be included along with the data of the content itself (e.g., in the same data stream) or separately from the content (e.g., in a separate data stream). Where the tags indicate media content portions and/or vendors, but not the vendor contact destinations themselves, then the determination steps 308 and 312 may include looking up (such as in an association table or database stored locally by CPE 101 and/or globally by network services control system 109), the indicated media content portion to determine the associated vendor contact destination(s) for that portion.

As can be seen, then, when the user of CPE 101 selects the "contact vendor" or "contact me" options of FIG. 3, the system (either locally by CPE 101 or by the service provider such as by network services control system 109) may determine a contextually-appropriate vendor with which the user may communicate.

Thus, various alternate means for initiating or requesting communications with third parties, such as emergency services parties and vendors, have been described. Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For instance, one of ordinary skill in the art will appreciate that the steps illustrated in the illustrative figures may be performed in other than the recited order, and that one or more steps illustrated may be optional in accordance with aspects of the disclosure. The description is thus to be regarded as illustrative of, rather than restrictive on, the present disclosure.

The invention claimed is:

1. A method, comprising:
   providing content over a network to a first device that is configured to display the content;
   receiving a first request from a user;
   determining, by a computer, a first contact destination based on which portion of the content is being displayed by the first device when the first request is made;
   determining a second contact destination of a second device based on an identity of the first device; and establishing a communication session between the determined first and second contact destinations.

2. The method of claim 1, wherein the first contact destination comprises a first telephone number, the second contact destination comprises a second telephone number, and establishing the communication session comprises:
   calling the first telephone number to generate a first call leg;
   calling the second telephone number to generate a second call leg; and
   coupling together the first and second call legs to form the call.

3. The method of claim 1, wherein the identity of the first device comprises a media access control (MAC) address of the first device.

4. The method of claim 1, wherein receiving the first request comprises receiving the first request from the first device.

5. The method of claim 1, wherein the content is displayed by the first device while it is being provided by the network to the first device.

6. The method of claim 1, wherein the content displayed by the first device is stored by the first device and displayed after it has been provided by the network to the first device.

7. A method, comprising:
   providing content over a network to a first device that is configured to display the content;
   receiving a first request from a user;
   determining, by a computer, a first contact destination based on which portion of the content is being displayed by the first device when the first request is made; and
   sending, to the first contact destination, a message that identifies a second contact destination.

8. The method of claim 7, further comprising determining the second contact destination based on an identity of the first device.

9. The method of claim 7, wherein receiving the request comprises receiving the first request from the first device.

10. The method of claim 7, wherein the first contact destination comprises an email address, and wherein sending the message comprises emailing the message to the email address.

11. The method of claim 7, wherein the second contact destination comprises a telephone number.

12. The method of claim 7, further comprising determining, responsive to the first request, a temporary telephone number, wherein the second contact destination comprises the temporary telephone number.

13. The method of claim 7, further comprising:
   receiving, from the first device, a second request;
   determining, responsive to the second request, a telephone number based on an identity of the first device; and
   establishing a communication session between the telephone number and an emergency service party.

14. A method, comprising:
   receiving a request generated by a first device;
   determining, by a computer, a type of the request;
   if the request is determined to be a first type of request, then determining, by the computer, a first contact destination based on an identity of the first device; and
   if the request is determined to be a second type of request, then determining, by the computer, a second contact destination based on which portion of video content is being displayed by the first device when the first request is made.

15. The method of claim 14, wherein the first contact destination comprises a first telephone number and the method further comprises:
   if the request is determined to be the first type of request, then requesting that a call be set up between the first telephone number and a second telephone number.

16. The method of claim 14, further comprising:
   if the request is determined to be the second type of request, then sending, to the second contact destination, a message that identifies a third contact destination.

17. The method of claim 16, wherein the first and third contact destinations are a same contact destination.

18. A method, comprising:
   receiving, over a network, a selection from a user of an emergency contact destination;
   storing data associating the emergency contact destination with a first device;
   receiving, over the network, an emergency service request from the first device; and
   responsive to the emergency service request:
      determining from the data the emergency contact destination associated with the first device, and
      establishing a communication session between the user and the emergency contact destination.

19. The method of claim 18, further comprising determining a second device based on an identity of the first device, wherein said establishing the communication session comprises establishing the communication session between the second device and the emergency contact destination.

20. The method of claim 1, wherein said determining the first contact destination comprises determining the first contact destination based on a timestamp of said portion of the content.

* * * * *